(12) United States Patent
Gima

(10) Patent No.: US 12,193,121 B2
(45) Date of Patent: Jan. 7, 2025

(54) LAMINATED GLASS

(71) Applicant: AGC Inc., Tokyo (JP)

(72) Inventor: Yuhei Gima, Tokyo (JP)

(73) Assignee: AGC INC., Tokyo (JP)

( * ) Notice: Subject to any disclaimer, the term of this patent is extended or adjusted under 35 U.S.C. 154(b) by 849 days.

(21) Appl. No.: 17/344,121

(22) Filed: Jun. 10, 2021

(65) Prior Publication Data

US 2021/0307123 A1    Sep. 30, 2021

Related U.S. Application Data

(63) Continuation of application No. PCT/JP2019/042532, filed on Oct. 30, 2019.

(30) Foreign Application Priority Data

Dec. 21, 2018  (JP) ................ 2018-240196

(51) Int. Cl.
| | | |
|---|---|---|
| *B32B 3/10* | (2006.01) | |
| *B32B 17/10* | (2006.01) | |
| *B60J 1/00* | (2006.01) | |
| *H05B 3/86* | (2006.01) | |

(52) U.S. Cl.
CPC ......... *H05B 3/86* (2013.01); *B32B 17/10036* (2013.01); *B32B 17/10385* (2013.01); *B60J 1/001* (2013.01); *B60J 1/002* (2013.01); *B32B 2307/202* (2013.01); *B32B 2315/08* (2013.01); *B32B 2605/006* (2013.01); *B32B 2605/08* (2013.01)

(58) Field of Classification Search
CPC ................ B32B 7/12; B32B 17/10036; B32B 17/10192; B32B 17/10385
See application file for complete search history.

(56) References Cited

U.S. PATENT DOCUMENTS

| | | |
|---|---|---|
| 2010/0200286 A1 | 8/2010 | Melcher et al. |
| 2011/0017719 A1 | 1/2011 | Choi et al. |
| 2019/0193530 A1 | 6/2019 | Chiba et al. |
| 2020/0005398 A1 | 1/2020 | Castinado et al. |

FOREIGN PATENT DOCUMENTS

| | | |
|---|---|---|
| JP | 2002-057518 A | 2/2002 |
| JP | 2011-515809 A | 5/2011 |
| JP | 2015-092486 A | 5/2015 |
| JP | 6203164 B2 | 9/2017 |

(Continued)

OTHER PUBLICATIONS

JP 2017/216193 (Dec. 2017).*

(Continued)

*Primary Examiner* — Elizabeth E Mulvaney
(74) *Attorney, Agent, or Firm* — Foley & Lardner LLP

(57) ABSTRACT

The present laminated glass includes a pair of glass plates facing each other; an interlayer positioned between the pair of glass plates; and a plurality of linear members arranged in parallel to heat a transparent region of the pair of glass plates, wherein each of the plurality of linear members has a line width of greater than or equal to 2 μm and less than or equal to 30 μm, and wherein at least part of the plurality of linear members has the line width that is not constant.

15 Claims, 11 Drawing Sheets

(56) References Cited

FOREIGN PATENT DOCUMENTS

| JP | 2017-204387 A | 11/2017 |
| JP | 2017-214059 A | 12/2017 |
| WO | WO-2018/038172 A1 | 3/2018 |

OTHER PUBLICATIONS

International Searching Authority, "International Search Report," issued in connection with International Patent Application No. PCT/JP2019/042532, dated Dec. 3, 2019.

International Searching Authority, "Written Opinion," issued in connection with International Patent Application No. PCT/JP2019/042532, dated Dec. 3, 2019.

\* cited by examiner

FIG.10

| | EX. 1 (SAMPLE 1) | EX. 2 (SAMPLE 2) | EX. 3 (SAMPLE 3) | EX. 4 (SAMPLE 4) | EX. 5 (SAMPLE 5) |
|---|---|---|---|---|---|
| $W_1$ [μm] | 10 | 10 | 10 | 10 | 12 |
| $W_2$ [μm] | 12 | 16 | 20 | 11 | 20 |
| $|W_1 - W_2|$ [μm] | 2 | 6 | 10 | 1 | 8 |
| APPEARANCE EVALUATION W.R.T. DIFFERENCE IN THE LINE WIDTH | EXCELLENT | EXCELLENT | FAILING | EXCELLENT | GOOD |

FIG.11

| | EX. 6 (SAMPLE 6) | EX. 7 (SAMPLE 7) | EX. 8 (SAMPLE 8) | EX. 9 (SAMPLE 9) | EX. 10 (SAMPLE 10) |
|---|---|---|---|---|---|
| $|W_i - W_{i+1}|max$ [μm] | 2 | 6 | 10 | 1 | 8 |
| STANDARD DEVIATION [μm] | 1 | 3.2 | 4.6 | 0.5 | 2.8 |
| EVALUATION OF RAINBOW PATTERN AND SHAFTS OF LIGHT | GOOD | GOOD | GOOD | FAILING | GOOD |

FIG.12

|  | EX. 11 (SAMPLE 11) | EX. 12 (SAMPLE 12) | EX. 13 (SAMPLE 13) | EX. 14 (SAMPLE 14) |
|---|---|---|---|---|
| $|WF_i - WF_{i+1}|max$ | 0.25 | 0.1 | 0.3 | 0.03 |
| EVALUATION OF RAINBOW PATTERN AND SHAFTS OF LIGHT | EXCELLENT | EXCELLENT | EXCELLENT | GOOD |
| APPEARANCE EVALUATION W.R.T. DIFFERENCE IN THE WAVE FACTOR | GOOD | EXCELLENT | FAILING | EXCELLENT |

LAMINATED GLASS

CROSS-REFERENCE TO RELATED APPLICATIONS

This U.S. non-provisional application is a continuation application of and claims the benefit of priority under 35 U.S.C. § 365(c) from PCT International Application PCT/JP2019/042532 filed on Oct. 30, 2019, which is designated the U.S., and is based upon and claims the benefit of priority of Japanese Patent Application No. 2018-240196 filed on Dec. 21, 2018, the entire contents of which are incorporated herein by reference.

TECHNICAL FIELD

The present disclosure relates to laminated glass.

BACKGROUND ART

Laminated glass in which a conductive heating element constituted with multiple linear members is interposed between a pair of glass plates, has been known as a windowpane of an automobile or a railway vehicle. By generating heat in the conductive heating element, this laminated glass can clear fog on the windowpane and/or eliminate frost of moisture adhered to the windowpane in winter.

However, in such laminated glass having linear members, there may be cases where light is diffracted by the linear members, to cause optical effects such that rainbow patterns are observed and/or shafts of light are generated. These optical effects cause the driver of the vehicle to feel a sense of discomfort, and are also undesirable from the viewpoint of safety. Thereupon, various techniques have been proposed for suppressing the optical effects due to diffracted light caused by linear members (see, for example, Japanese Patent No. 6203164).

However, the conventional proposed techniques cannot sufficiently suppress the optical effects due to diffracted light caused by linear members.

SUMMARY

According to an embodiment, a laminated glass includes a pair of glass plates facing each other; an interlayer positioned between the pair of glass plates; and a plurality of linear members arranged in parallel to heat a transparent region of the pair of glass plates, wherein each of the plurality of linear members has a line width of greater than or equal to 2 µm and less than or equal to 30 µm, and wherein at least part of the plurality of linear members has the line width that is not constant.

BRIEF DESCRIPTION OF DRAWINGS

FIG. 10 is a diagram (part 1) showing evaluation results;

FIG. 11 is a diagram (part 2) showing evaluation results; and

FIG. 12 is a diagram (part 3) showing evaluation results.

EMBODIMENTS OF THE INVENTION

In the following, embodiments for carrying out the invention will be described with reference to the drawings.

According to one embodiment of the disclosure, a laminated glass can be provided that can suppress the optical effects due to diffracted light caused by the linear members.

Throughout the drawings, the same elements are assigned the same reference symbols, and duplicated description may be omitted. Also, in some of the drawings, the size and shape may be partially exaggerated to facilitate understanding of the contents of the present disclosure.

Note that here, although a windshield for a vehicle will be taken as an example for the description, the application is not limited as such; a laminated glass according to the embodiments can be applied to a glass other than a windshield for a vehicle. Also, a vehicle is typically an automobile, but generally refers to a mobile body having glass that includes a train, a ship, an aircraft, and the like.

Also, "plan view" refers to viewing a predetermined region of a windshield in a direction normal to the predetermined region, and "planar shape" refers to a shape of the predetermined region of the windshield as viewed in a direction normal to the predetermined region.

First Embodiment

Figure 1A:
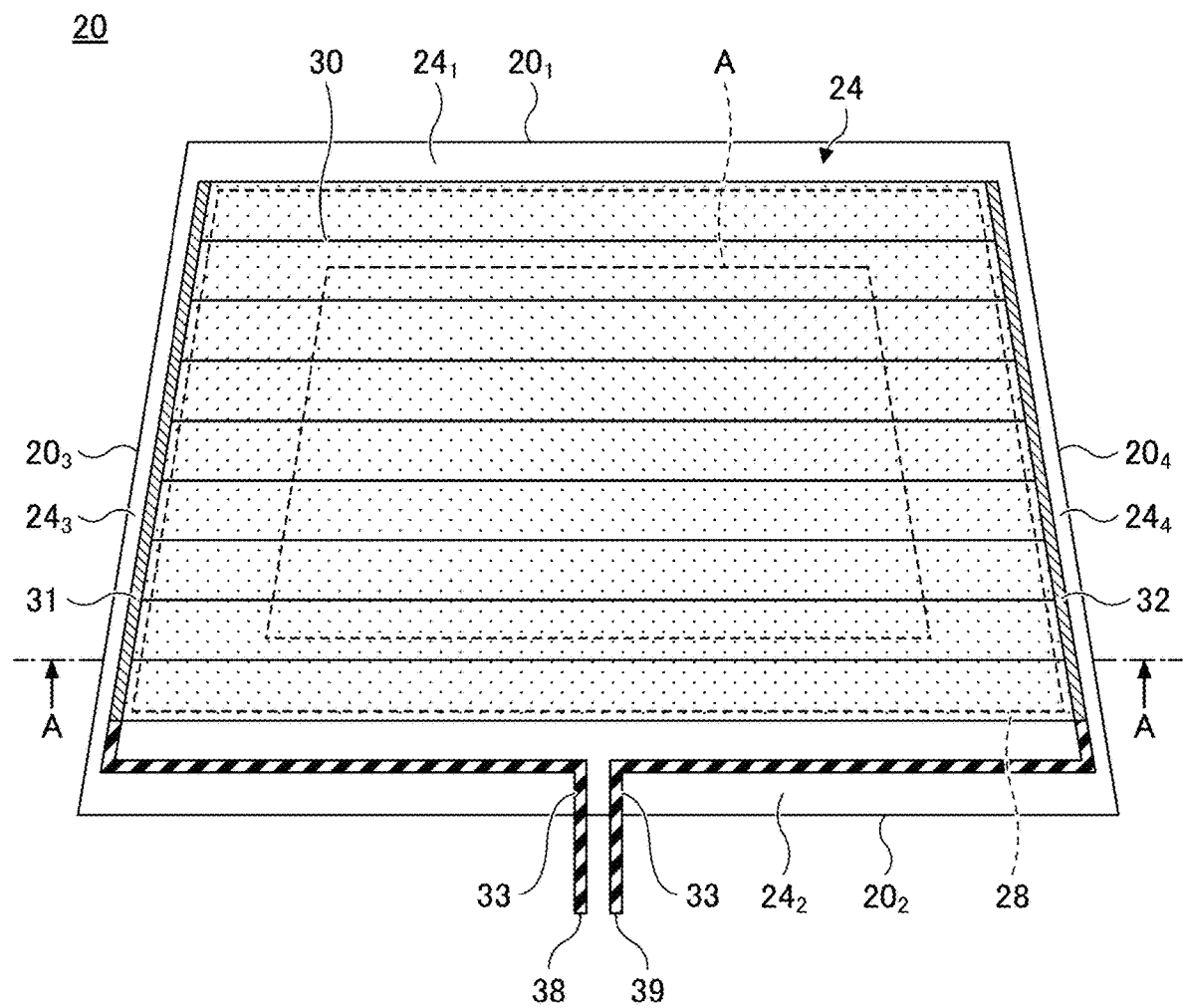
FIGS. 1A and 1B are diagrams (part 1) exemplifying a windshield for a vehicle according to a first embodiment.
Figure 1B:
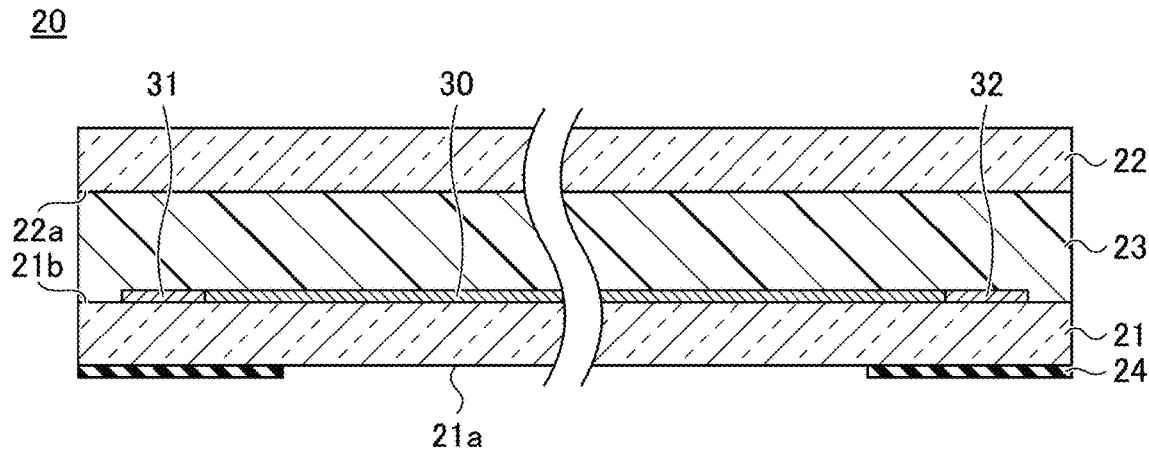

FIGS. 1A and 1B are diagrams (part 1) exemplifying a windshield for a vehicle according to a first embodiment, wherein FIG. 1A is a diagram schematically illustrating an appearance of the windshield as visually recognized from the interior of the vehicle toward the exterior of the vehicle; and FIG. 1B is a partially enlarged cross sectional view along a line A-A in FIG. 1A.

In FIGS. 1A and 1B, for the sake of convenience of illustration, the windshield 20 is illustrated to be planar without detailing an actual curved shape. Note that in the following description, a reference numeral $20_1$ denotes the upper edge, a reference numeral $20_2$ denotes the lower edge, a reference numeral $20_3$ denotes the left edge, and a reference numeral $20_4$ denotes the right edge of the windshield 20. Here, in the case where the windshield 20 is attached to a right hand drive vehicle, the upper edge corresponds to an edge on the roof side of the vehicle; the lower edge corresponds to an edge on the engine compartment side; the left edge corresponds to an edge on the front passenger seat side; and the right edge corresponds to an edge on the driver's seat side.

As illustrated in FIGS. 1A and 1B, the windshield 20 is a laminated glass for a vehicle that includes a glass plate 21, a glass plate 22, an interlayer 23, a shielding layer 24, a conductive heating element 30, a first busbar 31, a second busbar 32, and a third busbar 33. A test region A is demarcated on the windshield 20 as defined by UN Regulation No 43.

The glass plate 21 is a vehicle interior-side glass plate that is positioned on the vehicle interior side when the windshield 20 is attached to the vehicle. Also, the glass plate 22 is a vehicle exterior-side glass plate that is positioned on the vehicle exterior side when the windshield 20 is attached to the vehicle.

The glass plate 21 and the glass plate 22 are a pair of glass plates facing each other, and in the present embodiment, the interlayer 23, the conductive heating element 30, the first busbar 31, the second busbar 32, and the third busbar 33 are positioned between the pair of glass plates 21 and 22. The glass plate 21 and the glass plate 22 are adhered together in a state of having the interlayer 23, the conductive heating element 30, the first busbar 31, the second busbar 32, and the third busbar 33 interposed in-between.

However, the third busbar 33 simply needs to have at least part of it positioned between the pair of glass plates, and may have a part that comes out from a position between the pair of glass plates and extends toward the outside of the pair of glass plates. Also, as will be described later with reference to FIG. 9D, the conductive heating element 30, the first busbar 31, the second busbar 32, and the third busbar 33 may or may not be positioned between the pair of glass plates 21 and 22.

The conductive heating element 30, the first busbar 31, the second busbar 32, and the third busbar 33 are arranged between the interlayer 23 and the glass plate 21. The surfaces on the vehicle interior side of the conductive heating element 30, the first busbar 31, the second busbar 32, and the third busbar 33 contact a surface 21b on the vehicle exterior side of the glass plate 21. Also, the surfaces on the vehicle exterior side of the conductive heating element 30, the first busbar 31, the second busbar 32, and the third busbar 33 contact a surface on the vehicle interior side of the interlayer 23. Note that the interlayer 23 may be a laminate constituted with multiple layers.

The shielding layer 24 is an opaque layer and may be provided, for example, in a band shape along the upper edge $20_1$, the lower edge $20_2$, the left edge $20_3$, the right edge $20_4$ as the peripheral edge of the windshield 20. In the example in FIGS. 1A and 1B, the shielding layer 24 is provided on a surface 21a on the vehicle interior side of the glass plate 21. However, the shielding layer 24 may be provided on a surface 22a on the vehicle interior side of the glass plate 22 as needed, or may be provided on both the surface 21a on the vehicle interior side of the glass plate 21 and the surface 22a on the vehicle interior side of the glass plate 22.

The presence of the opaque shielding layer 24 at the peripheral edge of the windshield 20 can suppress degradation of resin such as urethane that holds the peripheral edge of the windshield 20 to the vehicle body, and an adhesive member and the like that attach a bracket to be engaged with a camera or the like to the windshield 20. Also, the busbars can be hidden.

Figure 2:
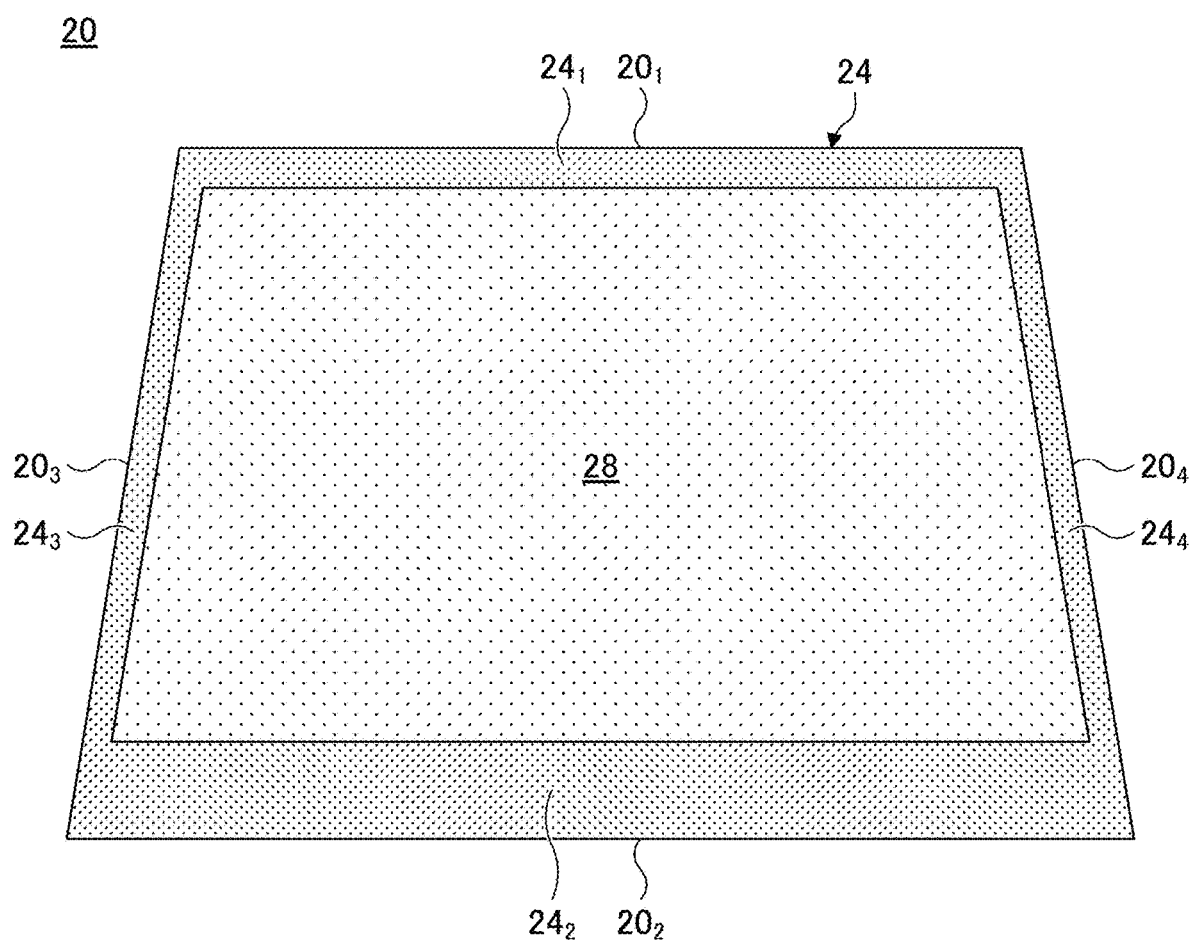
FIG. 2 is a diagram (part 2) exemplifying a windshield for a vehicle according to a first embodiment.

FIG. 2 is a diagram (part 2) exemplifying the windshield for a vehicle according to the first embodiment, and is a diagram schematically illustrating an appearance of the windshield as visually recognized from the interior of the vehicle toward the exterior of the vehicle. FIG. 2 exemplifies regions where the shielding layer 24 is formed.

The shielding layer 24 includes shielding regions $24_1$ and $24_2$ formed along the upper edge $20_1$ and the lower edge $20_2$ of the windshield 20, and shielding regions $24_3$ and $24_4$ formed along the left edge $20_3$ and the right edge $20_4$ of the windshield 20. In the shielding layer 24, from the viewpoint of widening the field of view on the left and right sides of the windshield 20, it is favorable that the width of the shielding regions $24_3$ and $24_4$ is formed to be narrower than the widths of the shielding regions $24_1$ and $24_2$.

In the windshield 20, a trapezoidal region surrounded by the shielding regions $24_1$, $24_2$, $24_3$, and $24_4$ is a transparent region 28. The conductive heating element 30 having multiple linear members arranged in parallel to heat the transparent region 28, is arranged in the transparent region 28. The transparent region 28 includes the test region A as defined in UN Regulation No. 43.

The conductive heating element 30 may be provided on the entire surface of the transparent region 28, or may be provided on part of the surface. For example, the conductive heating element 30 may be arranged in the test region A in the transparent region 28.

Note that FIG. 1A illustrates a perspective view of the shielding layer 24, in which only the reference numerals are designated for the shielding layer 24, and the shielding regions $24_2$, $24_2$, $24_3$, and $24_4$. The same applies to FIGS. 6 and 8 that will be described later.

Referring back to FIGS. 1A and 1B, the conductive heating element 30 includes multiple linear members arranged in parallel. The first busbar 31 is arranged along the left edge $20_3$ of the windshield 20, and the second busbar 32 is arranged along the right edge $20_4$ of the windshield 20.

The first busbar 31 and the second busbar 32 are arranged on the opposite sides so as to have the conductive heating element 30 of the transparent region 28 interposed in-between in plan view, and are connected to each of the linear members of the conductive heating element 30 that are arranged in parallel in the left and right direction. In other words, the windshield 20 adopts left and right power feeding that feeds power to each of the linear members of the conductive heating element 30 in the left and right direction.

The third busbar 33 is a busbar that connects the first busbar 31 to an electrode drawn-out portion 38, and connects the second busbar 32 to an electrode drawn-out portion 39. In other words, the electrode drawn-out portion 38 is electrically connected to the first busbar 31 via the third busbar 33, and the electrode drawn-out portion 39 is electrically connected to the second busbar 32 via the third busbar 33. The electrode drawn-out portions 38 and 39 are a pair of electrode drawn-out portions positioned at the ends of the third busbar 33, and connected respectively to the positive and negative terminals of an external power supply.

Once a voltage is applied between the electrode drawn-out portion 38 and the electrode drawn-out portion 39, a current flows through each of the linear members of the conductive heating element 30 connected between the first busbar 31 and the second busbar 32, to generate heat in the conductive heating element 30.

Also, it is favorable that the first busbar 31, the second busbar 32, and the third busbar 33 are arranged so as to be hidden in the shielded regions $24_3$, $24_4$, and $24_2$.

Figure 3:
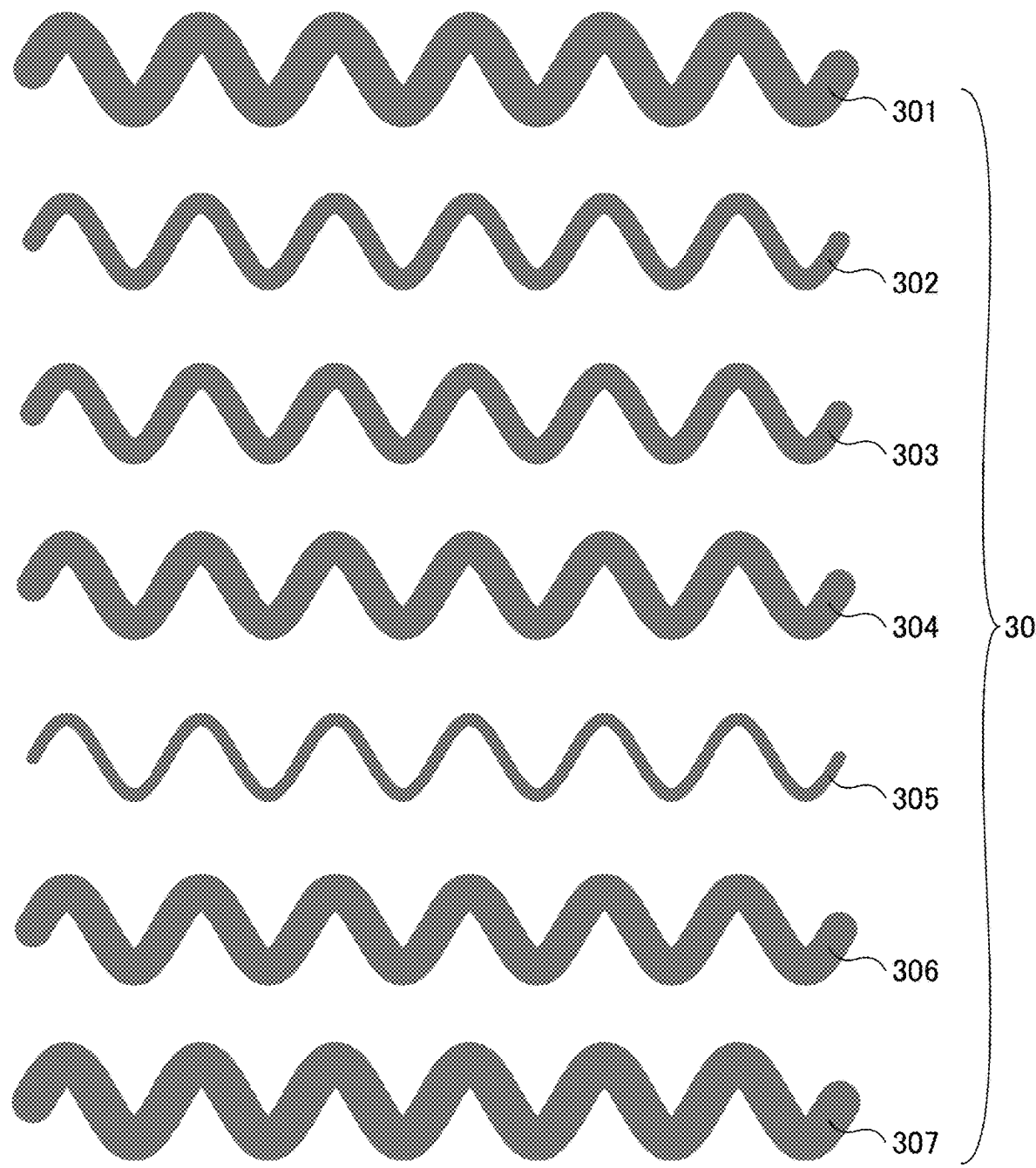
FIG. 3 is an enlarged view of linear members of a conductive heating element according to the first embodiment.

FIG. 3 is an enlarged view of the linear members of the conductive heating element according to the first embodiment. As illustrated in FIG. 3, at least some of the linear members included in the conductive heating element 30 have line widths that are not constant.

Here, the wording of "at least some of the linear members have line widths that are not constant" includes, for example, a case where at least two adjacent linear members included in the conductive heating element 30 have different line widths; and a case where at least one linear member included in the conductive heating element 30 has a line width that is not constant, namely, a case where the line width varies in the one linear member at different portions. Also, in the conductive heating element 30, these two cases may coexist.

FIG. 3 illustrates, as an example, a case where any two adjacent linear members included in the conductive heating element 30 have different line widths. Note that in FIG. 3, the line width is constant in each of the linear members.

As illustrated in FIG. 3, in the conductive heating element 30, in the case of varying the line widths between adjacent linear members, it is favorable that the following requirements are satisfied. In other words, among linear members within a 50-mm square at any location in the region where the conductive heating element 30 is arranged, when denoting the line width of any one of the linear members as $W_i$ [μm] and the line width of its adjacent linear member as $W_{i+1}$ [μm], it is favorable that the maximum value $|W_i-W_{i+1}|$max among absolute values of differences between $W_i$ and $W_{i+1}$ falls within a range of 1 [μm]<$|W_i-W_{i+1}|$max<10 [μm], and the standard deviation σ of the line width of the linear members in the square described above is greater than 0.5 [μm].

Note that for each of the linear members in the square described above, one end of the linear member in the square is defined as a start point, and a mean of line widths at 11 points measured at every 5 mm along the longitudinal direction of the linear member from the start point including the start point is defined as the line width of the linear member.

By satisfying 1 [μm]<$|W_i-W_{i+1}|$max and σ>0.5 [μm] as described above, irregularity of change in the line widths between adjacent linear members becomes greater; therefore, an effect of rectifying rainbow patterns due to diffraction of light and shafts of light due to regular scattering of light, is obtained sufficiently. Also, by satisfying $|W_i-W_{i+1}|$max<10 [μm] and σ>0.5 [μm], the driver is less likely to have a feeling of discomfort in the change in the line widths, and hence, can drive the vehicle safely. Note that shafts of light are, for example, beams of light.

It is more favorable to satisfy 1 [μm]<$|W_i-W_{i+1}|$max<8 [μm] and σ>0.5 [μm], and even more favorable to satisfy 1 [μm]<$|W_i-W_{i+1}|$max<6 [μm] and σ>0.5 [μm]. The driver is further less likely to have a feeling of discomfort in the change in the line widths, and hence, can drive the vehicle further safely.

For example, in FIG. 3, if the line widths of linear members 301 to 307 within any 50-mm square at any location are as tabulated in Table 1, the absolute value $|W_i-W_{i+1}|$ of the difference between the line widths for each pair of adjacent linear members become as tabulated in Table 2. In this case, $|W_i-W_{i+1}|$max=5 [μm] and σ=2 [μm] are obtained, which satisfies 1 [μm]<<6 [μm] and σ>0.5 [μm].

TABLE 1

| Linear member | Line width $W_i$ [μm] |
| --- | --- |
| 301 | 18 |
| 302 | 13 |
| 303 | 14 |
| 304 | 16 |

TABLE 1-continued

| Linear member | Line width $W_i$ [μm] |
| --- | --- |
| 305 | 12 |
| 306 | 15 |
| 307 | 17 |

TABLE 2

| Adjacent linear members | $|W_i - W_{i+1}|$ [μm] |
| --- | --- |
| 301-302 | 5 |
| 302-303 | 1 |
| 303-304 | 2 |
| 304-305 | 4 |
| 305-306 | 3 |
| 306-307 | 2 |

Note that in FIG. 3, although the linear members 301 to 307 included in the conductive heating element 30 are formed to be sinusoidal waves, each of the linear members may be formed to be a straight line, or formed to be a wavy line other than a sinusoidal wave, such as a triangular wave or a square wave. Also, a straight portion and a wavy portion may coexist in a single linear member. Also, an entirely straight linear member and an entirely wavy linear member may coexist.

Also, in FIG. 3, although the wavelength and the cycle of the linear members 301 to 307 included in the conductive heating element 30 are set to be constant, in the case where each of the linear members in the conductive heating element 30 is a wavy line, the wavelength or the cycle does not need to be constant. Also, in the case where each of the linear members is a wavy line, although the phase may be aligned or may be shifted between adjacent linear members, if the phase is shifted between adjacent linear members, it is suitable as rainbow patterns and shafts of light can be further rectified.

The irregularity of the line width of the linear members is particularly effective in the test region A as defined in UN Regulation No 43. This is because the test region A occupies most of the field of view of the driver, in which rainbow patterns due to diffracted light of the headlights of an oncoming vehicle, and shafts of light due to regular scattering of light, have the greatest influence on the driver.

Note that in the conductive heating element 30, it is favorable to adjust at least one of the interval, line length, and WF among the linear members, simultaneously changing the line width among the linear members. This makes the resistance values of the linear members uniform, and thereby, enables uniform heat generation. Note that WF stands for a wave factor, and the wave factor is a value obtained by dividing the line length of a wavy line having a point A as the start point and a point B as the end point, by the straight-line distance between the point A and the point B.

Among linear members within a 50-mm square at any location in the region where the conductive heating element 30 is arranged, when denoting the wave factor of any one of the linear members as $WF_i$, and the wave factor of its adjacent linear member as $WF_{i+1}$, it is favorable that the maximum value $|WF_i-WF_{i+1}|$max among absolute values of differences between $WF_i$ and $WF_{i+1}$ falls within a range of 0.03<$|WF_i-WF_{i+1}|$max<0.3.

If $0.03<|WF_i-WF_{i+1}|max$ is satisfied, the irregularity of change in the line widths between adjacent linear members becomes greater; therefore, an effect of rectifying rainbow patterns due to diffraction of light and shafts of light due to regular scattering of light, is obtained sufficiently. Also, if $|WF_i-WF_{i+1}|max<0.3$ is satisfied, the driver is less likely to have a feeling of discomfort in the change in the line widths, and hence, can drive the vehicle safely.

Next, materials and the like of each component of the windshield 20 will be described.

[Glass Plates 21 and 22]

The glass plates 21 and 22 may be inorganic glass or may be organic glass. As the inorganic glass, for example, soda-lime glass, borosilicate glass, alkali-free glass, quartz glass, and the like can be used without specific restrictions. Among these, soda-lime glass is particularly favorable. The inorganic glass may be either of non-tempered glass or tempered glass. Non-tempered glass is obtained by forming molten glass into a plate, and then slowly cooling down the plate. Tempered glass is glass having a compression stress layer formed on the surface of non-tempered glass.

The tempered glass may be either of physically tempered glass such as, for example, thermally tempered glass, or chemically tempered glass. In the case of physically tempered glass, a glass plate that has been uniformly heated during bend forming may be cooled down rapidly from a temperature around the softening point, to generate a compression stress on the glass surface by difference in temperature between the glass surface and the glass interior so as to temper the glass surface.

In the case of chemically tempered glass, after bend forming, the glass surface may be tempered by generating a compression stress on the glass surface by an ion exchange method or the like. Also, glass that absorbs ultraviolet rays or infrared rays may be used, and the glass is further favorable to be transparent; however, it may be a glass plate that is colored to an extent not impairing the transparency.

On the other hand, as the organic glass, transparent resin such as polycarbonate and the like may be considered. The shape of the glass plates 21 and 22 is not specifically limited to a rectangular shape, and may be a shape processed to have various shapes and curvatures. For the bend forming of the glass plates 21 and 22, gravity forming, press forming, or the like is used. Although the forming method of the glass plates 21 and 22 is not limited in particular, for example, in the case of inorganic glass, it is favorably a glass plate formed by a float process or the like.

The plate thickness of the glass plates 21 and 22 is favorably greater than or equal to 0.4 mm and less than or equal to 3.0 mm, more favorably greater than or equal to 1.0 mm and less than or equal to 2.5 mm, even more favorably greater than or equal to 1.5 mm and less than or equal to 2.3 mm, and particularly favorably greater than or equal to 1.7 mm and less than or equal to 2.0 mm. The glass plates 21 and 22 may have the same thickness or may have thicknesses different from each other. Also, one of or both of the glass plates 21 and 22 may have a wedge shape such that the thickness of the plate becomes thicker as moving from the lower side to the upper side. In the case where the thicknesses of the glass plates 21 and 22 are different from each other, it is favorable that the thickness of a glass plate positioned on the vehicle interior side is thinner. In the case where the thickness of the glass plate positioned on the vehicle interior side is thinner, if the thickness of the glass plate positioned on the vehicle interior side is greater than or equal to 0.4 mm and less than or equal to 1.3 mm, the weight of the windshield 20 can be sufficiently reduced.

[Interlayer 23]

As the interlayer 23, a thermoplastic resin is frequently used, and as thermoplastic resins conventionally used for this type of application, for example, plasticized polyvinyl acetal-based resin, plasticized polyvinyl chloride-based resin, saturated polyester-based resin, plasticized saturated polyester-based resin, polyurethane-based resin, plasticized polyurethane-based resin, ethylene-vinyl acetate copolymer-based resin, ethylene-ethyl acrylate copolymer-based resin, and the like may be enumerated. Also, a resin composition that contains a modified block copolymer hydride described in Japanese Laid-Open Patent Application No. 2015-821 is also suitably used. The interlayer 23 is favorably a plasticized polyvinyl acetal-based resin, and more favorably polyvinyl butyral.

It is favorable that the film thickness of the interlayer 23 at the thinnest portion is greater than or equal to 0.3 mm as the total film thickness in the configuration illustrated in FIG. 1B. If the film thickness of the interlayer 23 is greater than or equal to 0.3 mm, the penetration tolerance required as a windshield becomes sufficient. Also, it is favorable that the film thickness of the interlayer 23 at the thickest portion is less than or equal to 2.28 mm. If the maximum value of the film thickness of the interlayer 23 is less than or equal to 2.28 mm, the mass of the laminated glass does not become too heavy. It is favorable that the film thickness of the interlayer 23 is greater than or equal to 0.3 mm and less than or equal to 1 mm. Also, the film thickness of the interlayer 23 does not need to be uniform, and may have a wedge shape as viewed in cross section.

Note that the interlayer 23 may have a sound insulating function. For example, the interlayer 23 may be a sound insulation film that can improve the sound insulation performance of the laminated glass, by having the interlayer constituted with three or more layers, and by making the shore hardness of an inner layer lower than those of outer layers by adjusting a plasticizer or the like. In this case, the shore hardness of the outer layers may be the same or may be different.

In order to produce an interlayer 23, for example, a resin material to form the interlayer is selected appropriately from among those described above, and in a heated and melted state, extruded to be formed by using an extruder. Extrusion conditions such as the extrusion speed of the extruder are set to be uniform. Thereafter, in order to impart curvatures on the upper side and on the lower side according to design of the windshield 20, for example, the resin film formed by the extrusion may be stretched as needed.

[Shielding Layer 24]

As the shielding layer 24, a layer may be exemplified that is formed by applying a black ceramic printing ink to a glass plate by screen printing or the like, and then firing the ink thereon. In the shielding layer 24, it is favorable that the widths of the shielding regions $24_1$ to $24_4$ are greater than the width of the first busbar 31, the second busbar 32, or the third busbar 33 arranged in the shielding regions.

If the shielding layer 24 is provided on the surface 21a on the vehicle interior side of the glass plate 21, when viewing the windshield 20 from the vehicle interior, the first busbar 31, the second busbar 32, and the third busbar 33 can be hidden by the shielding layer 24, and thereby, design of the external appearance is not impaired and is favorable.

Also, if the shielding layer 24 is provided on the surface 22a on the vehicle interior side of the glass plate 22, when viewing the windshield 20 from the vehicle exterior, the first busbar 31, the second busbar 32, and the third busbar 33 can be hidden by the shielding layer 24, and thereby, design of the external appearance is not impaired and is favorable.

Also, the shielding layer 24 may be provided on both the surface 21a on the vehicle interior side of the glass plate 21 and the surface 22a on the vehicle interior side of the glass plate 22. In this case, when viewing the windshield 20 from the vehicle interior and from the vehicle exterior, the first busbar 31, the second busbar 32, and the third busbar 33 can be hidden by the shielding layer 24, and thereby, design of the external appearance is not impaired and is further favorable.

[Conductive Heating Element 30, First Busbar 31, and Second Busbar 32]

The conductive heating element 30, the first busbar 31, and the second busbar 32 can be integrally formed of the same material.

Although the material of the conductive heating element 30, the first busbar 31, and the second busbar 32 is not limited in particular as long as being a conductive material, for example, metallic materials may be enumerated. As examples of the metallic materials, gold, silver, copper, aluminum, tungsten, platinum, palladium, nickel, cobalt, titanium, iridium, zinc, magnesium, tin, and the like may be enumerated. Also, these metals may be plated or may be an alloy or a composite with resin.

The method of forming the conductive heating element 30, the first busbar 31, and the second busbar 32 may be a method of etching such as photolithography or the like, or a method of printing such as screen printing, ink jet printing, offset printing, flexographic printing, gravure printing, or the like. By any one of the methods, the conductive heating element 30, the first busbar 31, and the second busbar 32 can be integrally formed of the same material. In this case, the conductive heating elements 30, the first busbar 31, and the second busbar 32 may be formed to have the same thickness, or may be formed to have thicknesses different from one another.

In the conductive heating element 30, the line width of each of the linear members is favorably less than or equal to 30 μm, more favorably less than or equal to 25 μm, and even more favorably less than or equal to 20 μm. If the linear members of the conductive heating element 30 have a line width of less than or equal to 30 μm, the linear members are less likely to be visually recognized by the driver, and the presence of the linear members can be prevented from hindering the driving. As the line width of the linear members of the conductive heating element 30 becomes narrower to be less than or equal to 25 μm, and to be less than or equal to 20 μm, and so on, the linear members are further less likely to be visually recognized by the driver, and the presence of the linear members can be further prevented from hindering the driving.

Also, in the conductive heating element 30, the line width of each of the linear members is favorably greater than or equal to 2 μm. In the conductive heating element 30, by making the line width of each of the linear members greater than or equal to 2 μm, the pattern of each of the linear members can be formed with a high yield.

In the conductive heating element 30, the thickness of each of the linear members is favorably less than or equal to 20 μm, more favorably less than or equal to 12 μm, and even more favorably less than or equal to 8 μm. A thinner thickness of the linear members of the conductive heating element 30, makes the area where the linear members reflects light smaller, and makes light such as sunlight or light of the headlamps of an oncoming car less reflective; therefore, the reflected light can be prevented from hindering the driving performed by the driver.

[Method of Producing Windshield 20]

As the method of producing the windshield 20, a typical producing method can be used, and one example will be described as follows.

First, a conductive heating element 30, a first busbar 31, a second busbar 32, and a third busbar 33 are formed on the vehicle interior side surface of an interlayer 23. The conductive heating element 30, the first busbar 31, and the second busbar 32 can be integrally formed of the same material. The method of forming the conductive heating element 30, the first busbar 31, the second busbar 32, and the third busbar 33 on the vehicle interior side surface of the interlayer 23 may form those, for example, directly on the interlayer 23. Alternatively, for example, the interlayer may be constituted with two or more layers, and on one interlayer, another interlayer that has a surface on which the conductive heating element 30, the first busbar 31, the second busbar 32, and the third busbar 33 are formed is laminated, to make the interlayer 23. The latter will be described in detail later.

Next, a first laminate is produced on the glass plate 21 by laminating the interlayer 23 so that the surface 21b on the vehicle exterior side of the glass plate 21 contacts the vehicle interior side surfaces of the first busbar 31, the second busbar 32, and the third busbar 33 formed on the interlayer 23. Then, a second laminate is produced by further laminating the glass plate 22 on the interlayer 23 of the first laminate.

Then, for example, the second laminate is placed in a rubber bag and bonded in a vacuum of −65 to −100 kPa at a temperature around 70 to 110° C. Further, for example, by applying a joining treatment of heating and pressurization to the laminate under conditions of, for example, 100 to 150° C. and a pressure of 0.6 to 1.3 MPa, a laminated glass having more excellent durability can be obtained. However, in some cases, this heating and pressurization process is not used, in consideration of simplification of the process, and the characteristics of the materials enclosed into the laminated glass. The heating and pressurization in the vacuum deforms the interlayer 23, and causes the surface on the vehicle interior side of the conductive heating element 30 formed on the interlayer 23 to contact the surface 21b on the vehicle exterior side of the glass plate 21.

In this way, in the windshield 20, the widths of the multiple linear members arranged in parallel are greater than or equal to 2 μm and less than or equal to 30 μm, and the line width is not constant at least in some of the multiple linear members. By these features, an optical effect caused by diffracted light from the linear members can be suppressed.

In particular, by satisfying the following first requirement or second requirement, the line widths of the linear members can be varied irregularly, and thereby, the effect of suppressing the optical effect becomes further greater.

The first requirement is that the conductive heating elements 30 include linear members having line widths different from one another, and among linear members within a 50-mm square at any location in the region where the linear members are arranged, when denoting the line width of any one of the linear members as $W_i$ [μm] and the line width of its adjacent linear member as $W_{i+1}$ [μm], the maximum value $|W_i-W_{i+1}|$max among absolute values of differences between $W_i$ and $W_{i+1}$ falls within a range of 1 [μm]<$|W_i-W_{i+1}|$max<10 [μm], and the standard deviation of the line width of the linear members in the square described above is greater than 0.5 [μm].

The second requirement is that the conductive heating elements 30 include linear members having line widths different from one another, and among linear members within a 50-mm square at any location in the region where the linear members are arranged, when denoting the wave factor of any one of the linear member as WFi, and the wave factor of its adjacent linear member as $WF_{i+1}$, the maximum value $|WF_i-WF_{i+1}|max$ among absolute values of differences between $WF_i$ and $WF_{i+1}$ falls within a range of $0.03<|WF_i-WF_{i+1}|max<0.3$.

Modified Example of First Embodiment

In a modified example of the first embodiment, an example will be described in which a coloring process is applied to linear members included in a conductive heating element. Note that in the modified example of the first embodiment, descriptions of the same elements as in the embodiment described already may be omitted.

Figure 4:
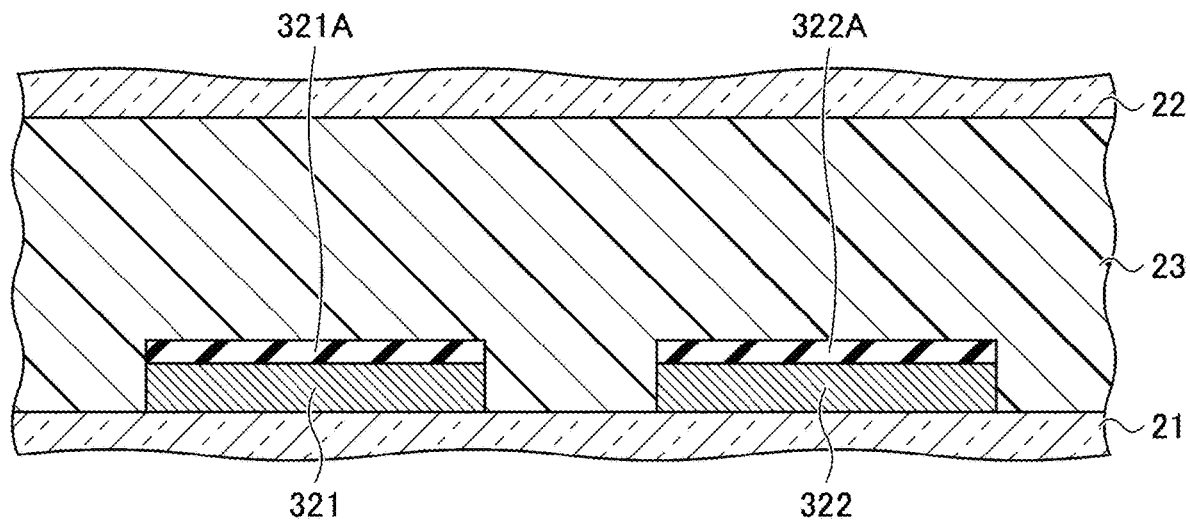
FIG. 4 is a partially enlarged view (part 1) of linear members of a conductive heating element according to a modified example of the first embodiment.

FIG. 4 is a partially enlarged view (part 1) of linear members of a conductive heating element according to the modified example of the first embodiment, and illustrates a cross section in a direction perpendicular to the longitudinal direction of the linear members. In other words, the direction normal to the page is the longitudinal direction of the linear members.

As illustrated in FIG. 4, the surface on the vehicle exterior side of a linear member 321 is colored, and a colored portion 321A is formed. Similarly, the surface on the vehicle exterior side of a linear member 322 is colored, and a colored portion 322A is formed. Similarly, the surface on the vehicle exterior side is colored for each of the linear members (not illustrated), and colored portions are formed.

The coloring process is not limited in particular as long as having an effect of alleviating rainbow patterns and shafts of light, and as an example, a blackening process may be considered. The blackening process is a process of roughening a surface by using, for example, a strong alkaline solution or the like, and as specific methods, oxidation, sulfidation, black plating, and the like may be enumerated.

In this way, by having at least some of the linear members in a state where the line widths are not constant as described in the first embodiment, and in addition, by applying a coloring process to the surface on the vehicle exterior side of each of the linear members, the effect of rectifying rainbow patterns and shafts of light can be further rectified.

Figure 5:
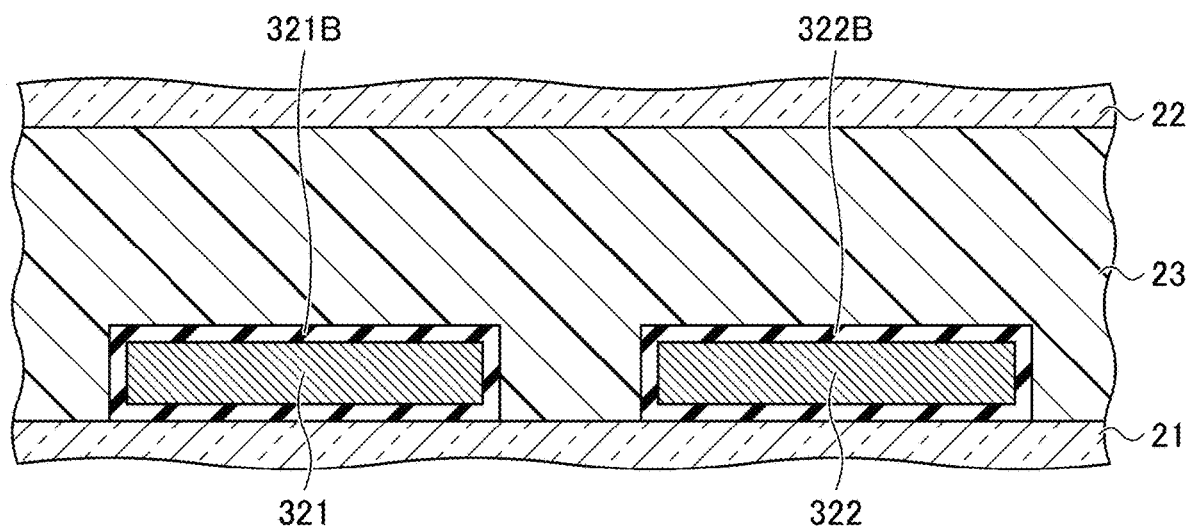
FIG. 5 is a partially enlarged view (part 2) of linear members of a conductive heating element according to the modified example of the first embodiment.

FIG. 5 is a partially enlarged view (part 2) of linear members of a conductive heating element according to the modified example of the first embodiment, and illustrates a cross section in a direction perpendicular to the longitudinal direction of the linear members. In other words, the direction normal to the page is the longitudinal direction of the linear members.

As illustrated in FIG. 5, the surface on the vehicle exterior side, the surface on the vehicle interior side, and the side surfaces of the linear member 321 are colored, and a colored portion 321B is formed. Similarly, the surface on the vehicle exterior side, the surface on the vehicle interior side, and the side surfaces of the linear member 322 are colored, and a colored portion 322B is formed. The coloring process is, for example, a blackening process, as in the case of FIG. 4.

In this way, at least some of the linear members are put into a state where the line widths are not constant as described in the first embodiment, and in addition, the coloring process can be applied to the surface on the vehicle exterior side, the surface on the vehicle interior side, and the side surfaces of each of the linear members. In this case, compared to the case of FIG. 4 in which the coloring process is applied only to the surface on the vehicle exterior side of each of the linear members, the effect of rectifying rainbow patterns and shafts of light can be further enhanced.

Second Embodiment

In a second embodiment, an example will be described in which power is fed to linear members of a conductive heating element in the up and down direction. Note that in the second embodiment, descriptions of the same elements as in the embodiment described already may be omitted.

Figure 6:
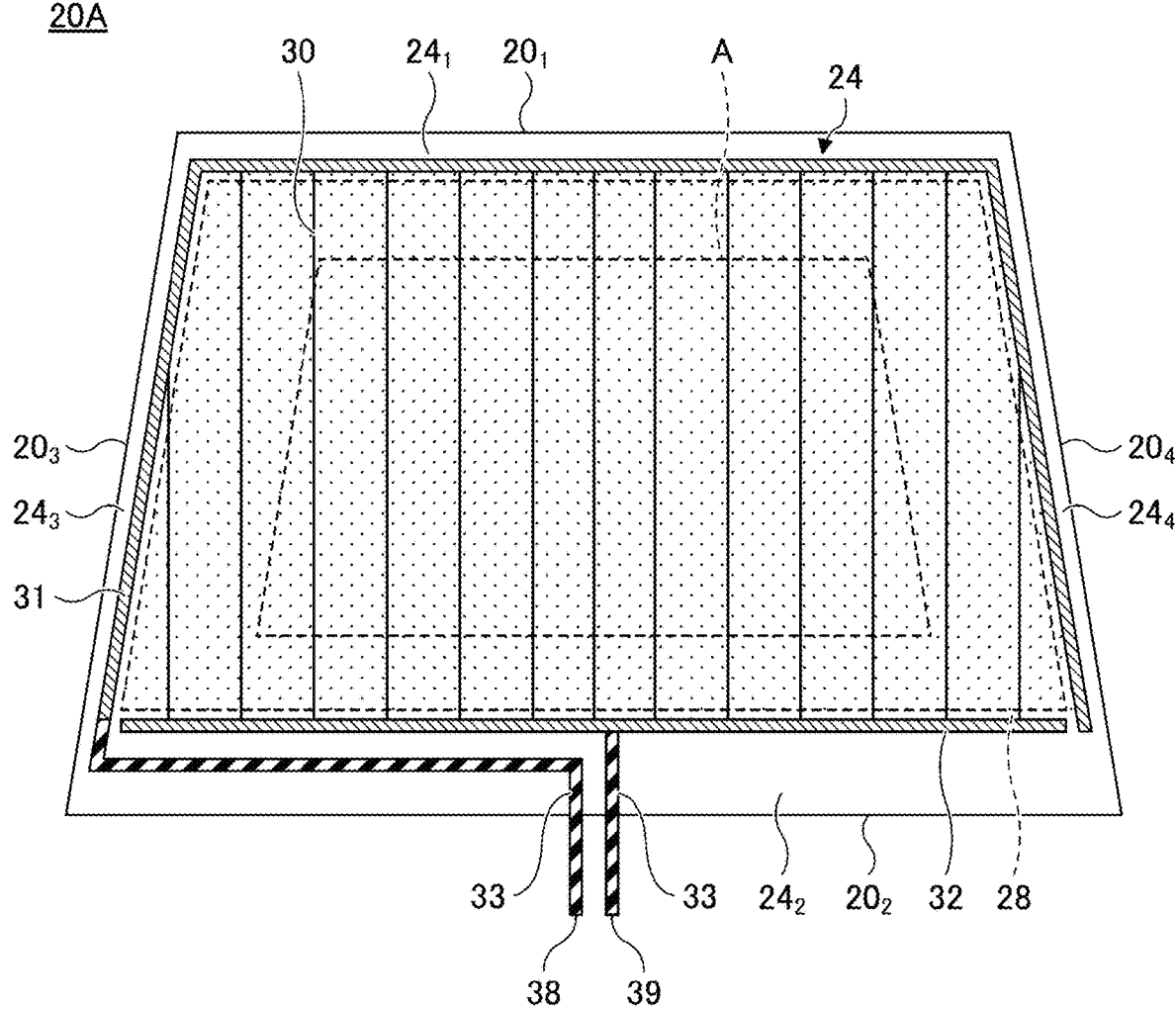
FIG. 6 is a diagram exemplifying a windshield for a vehicle according to a second embodiment.

FIG. 6 is a diagram exemplifying a windshield for a vehicle according to the second embodiment, and is a diagram schematically illustrating an appearance of the windshield as viewed from the interior of the vehicle toward the exterior of the vehicle.

As illustrated in FIG. 6, in a windshield 20A, a first busbar 31 is arranged continuously along the right edge $20_4$, the upper edge $20_2$, and the left edge $20_3$ of the windshield 20, and a second busbar 32 is arranged along the lower edge $20_2$ of the windshield 20.

The first busbar 31 and the second busbar 32 are connected to each of the linear members of a conductive heating element 30 that are arranged in parallel in the up and down direction as the longitudinal direction. In other words, the windshield 20A adopts up and down power feeding that feeds power to each of the linear members of the conductive heating element 30 in the up and down direction.

Also in the case of up and down power feeding as in the windshield 20A illustrated in FIG. 6, as in the case of left and right power feeding as in the windshield 20 illustrated in FIGS. 1A and 1B, by having at least some of the linear members in a state where the line widths are not constant, rainbow patterns and shafts of light can be rectified.

Figure 7A:
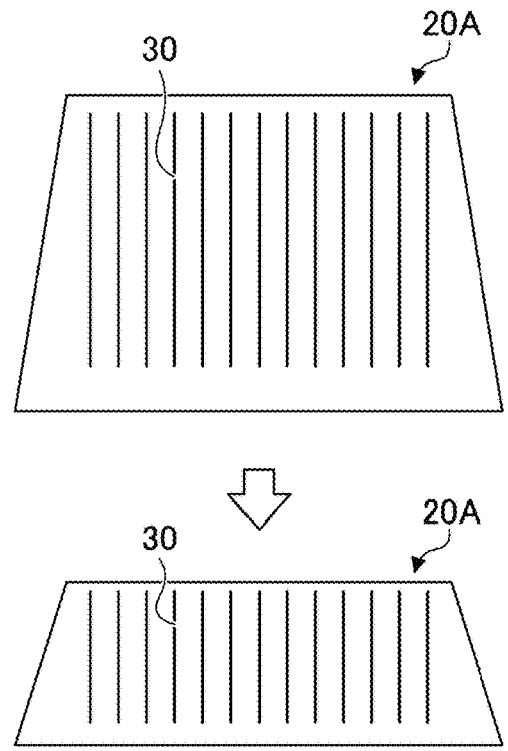
FIGS. 7A and 7B are diagrams illustrating change in the interval between the linear members depending on the setting angle of a windshield.
Figure 7B:
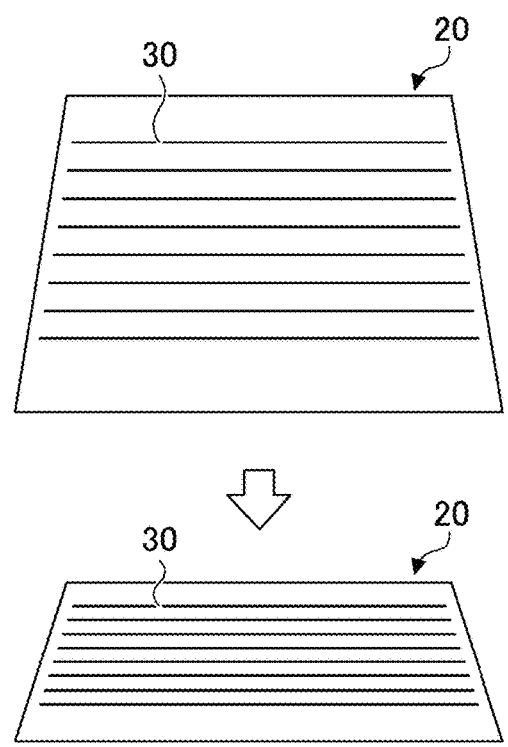

Note that as illustrated in FIG. 7A, in the case of up and down power feeding, the interval between the linear members of the conductive heating element 30 remains unchanged even when the setting angle lies down when the windshield is attached to a vehicle. In contrast, as illustrated in FIG. 7B, in the case of left and right power feeding, the interval between the linear members of the conductive heating element 30 narrows when the setting angle lies down when the windshield is attached to a vehicle. Here, in each of FIGS. 7A and 7B, the lower side of a white arrow illustrates the case where the setting angle lies down when the windshield is attached to the vehicle.

In the case of left and right power feeding in which the linear members are arranged in the left and right direction of the windshield, depending on the setting angle of the windshield, the interval between the linear members narrows, and the number of linear members visually recognized by the driver of the vehicle increases.

As the interval between the linear members becomes narrower and the number of linear members visually recognized by the driver becomes greater, the optical effect is amplified, and rainbow patterns and shafts of light tend to become more noticeable. Therefore, in the case of left and right power feeding rather than in the case of up and down power feeding, the effect of having at least some of the linear members in a state where the line widths are not constant, becomes even greater.

Third Embodiment

In a third embodiment, an example will be described in which a conductive heating element is arranged in a windshield having an information transmission/reception region. Note that in the third embodiment, descriptions of the same elements as in the embodiments described already may be omitted.

Figure 8A:
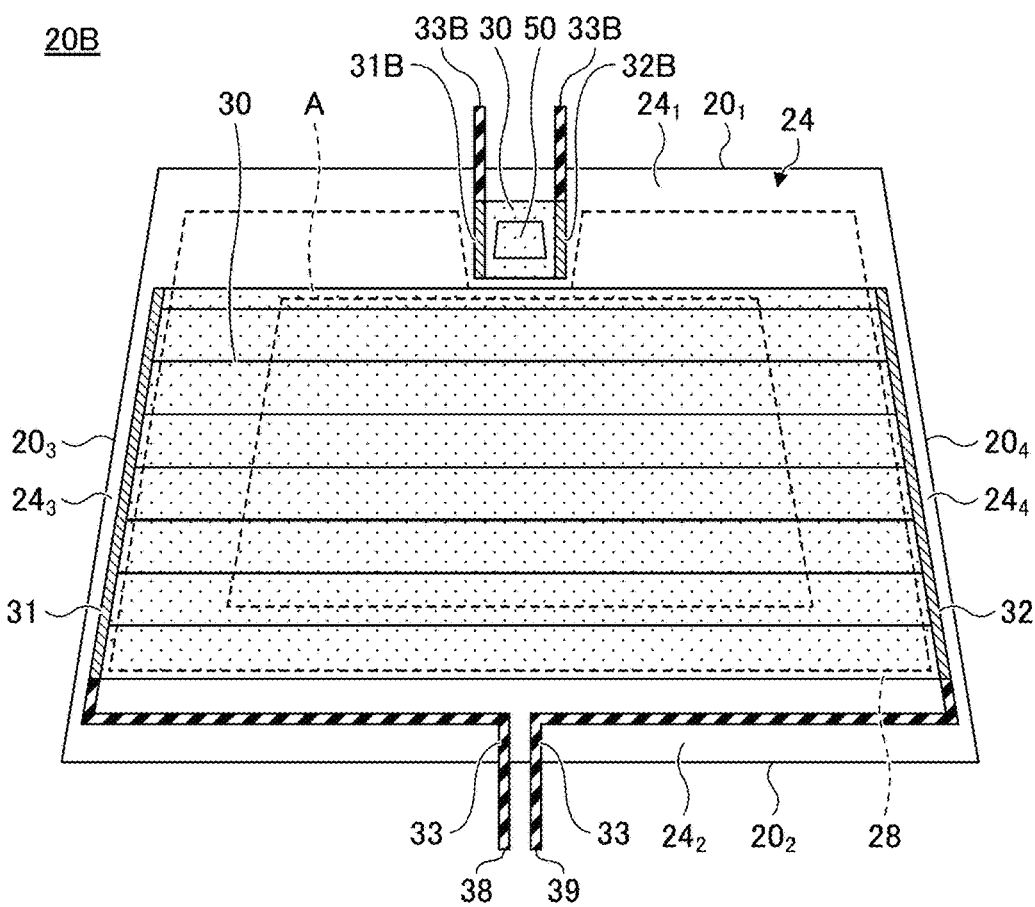
FIGS. 8A and 8B are diagrams exemplifying a windshield for a vehicle according to a third embodiment.
Figure 8B:
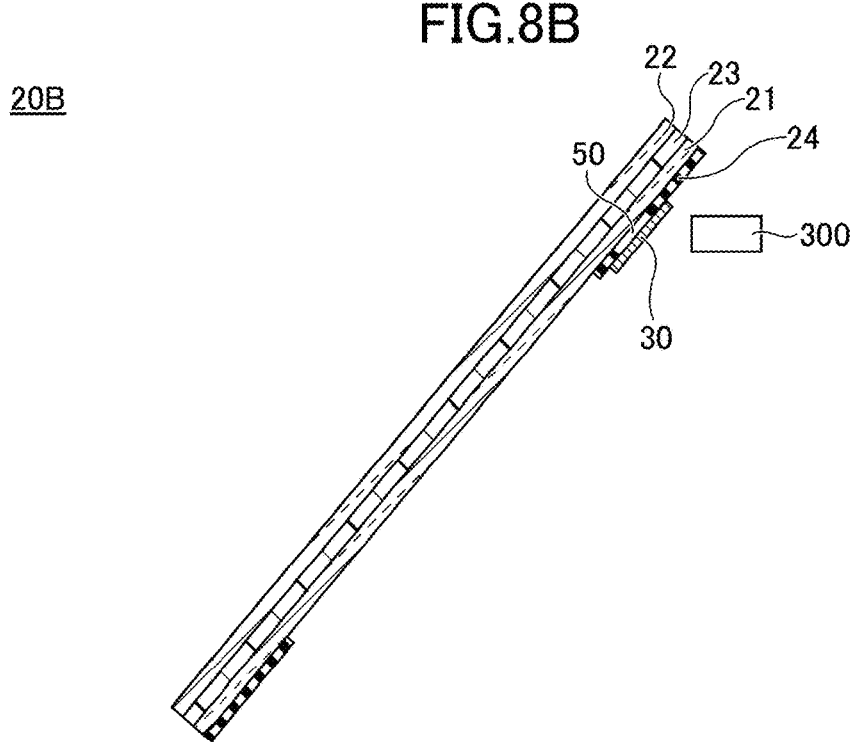

FIGS. 8A and 8B are diagrams exemplifying a windshield for a vehicle according to the third embodiment, wherein FIG. 8A is a diagram schematically illustrating an appearance of a windshield as viewed from the interior of the vehicle toward the exterior of the vehicle; and FIG. 8B is a longitudinal sectional view of the windshield 20B illustrated in FIG. 8A. Note that although FIG. 8B illustrates a device 300 together with the windshield 20B for the sake of convenience, the device 300 is not a component of the windshield 20B. The device 300 is, for example, a camera or various types of sensors.

As illustrated in FIGS. 8A and 8B, on the windshield 20B, an information transmission/reception region 50 is demarcated. In the case where the device 300 that transmits and/or receives information is arranged in the vicinity of the upper edge $20_1$ of the windshield 20B in the vehicle, the information transmission/reception region 50 functions as a region through which the device 300 transmits and/or receives information. Although the planar shape of the information transmission/reception region 50 is not limited in particular, the shape is, for example, an isosceles trapezoid.

As illustrated in FIGS. 8A and 8B, a conductive heating element 30 may be arranged in the information transmission/reception region 50. Power can be fed to the conductive heating element 30 in the information transmission/reception region 50 by a first busbar 31B, a second busbar 32B, and a third busbar 33B. In FIGS. 8A and 8B, heating can be independently executed in the transparent region 28 and in the information transmission/reception region 50.

In this way, the conductive heating element 30 can also be arranged in the information transmission/reception region 50. In the conductive heating element 30 in the information transmission/reception region 50, as described in the first embodiment and in the modified example, it is favorable to have at least some of the linear members in a state where the line widths are not constant. This effectively suppresses rainbow patterns caused by diffraction of light and shafts of light caused by regular scattering of light, and thereby, anti-fogging and ice melting functions by heating can be exercised without hindering the recognition capability of the device 300.

Also, as the information transmission/reception region 50, there exist one type having the lower side surrounded by a shielding layer, and another type not having the lower side surrounded by a shielding layer. In the case where the lower side of the information transmission/reception region 50 is not surrounded by a shielding layer, it is difficult to install a busbar at the lower side, and it is necessary to install busbars on the left and on the right, to adopt left and right power feeding. Also in the case of the conductive heating element 30 of the information transmission/reception region 50, as described in the second embodiment, in the case of left and right power feeding, the effect of having at least some of the linear members in a state where the line widths are not constant, becomes greater.

<Modified Example of Cross Sectional Structure>

Although the cross sectional structure of the windshield 20 is illustrated in FIG. 1B, the cross sectional structure of the windshield 20 is not limited to FIG. 1B, and in each embodiment and each modified example, the structure may be modified as illustrated in FIGS. 9A to 9D. Note that in FIGS. 9A to 9D, descriptions of the same elements as in the embodiments described already may be omitted.

FIGS. 9A to 9D are cross sectional views illustrating modified examples of the cross sectional structure of a windshield, and illustrates cross sections corresponding to FIG. 1B.

Figure 9A:
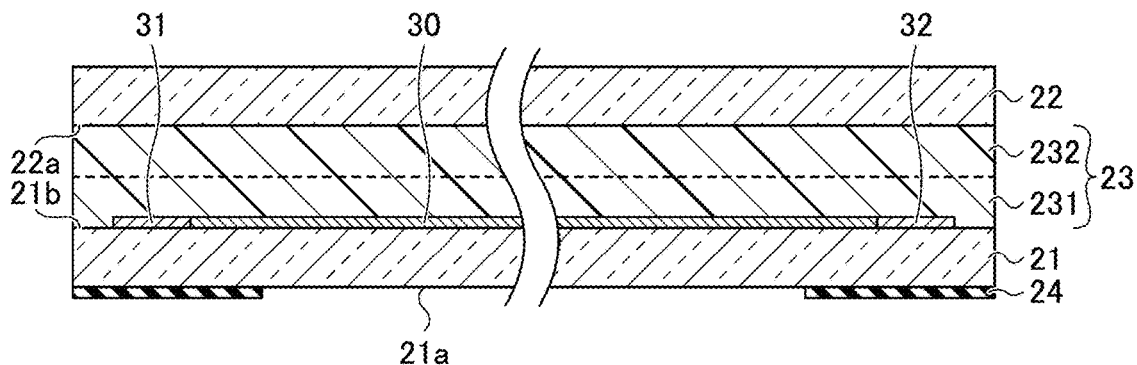
FIGS. 9A, 9B, 9C, and 9D are cross sectional views illustrating modified examples of a cross sectional structure of a windshield.

FIG. 9A illustrates an example in which the single-layer interlayer 23 in FIG. 1B is changed to a laminated structure constituted with a first interlayer 231 provided on the glass plate 21 side and a second interlayer 232 provided on the glass plate 22 side. The first interlayer 231 contacts the second interlayer 232. The conductive heating element 30, the first busbar 31, and the second busbar 32 are arranged between the first interlayer 231 and the glass plate 21.

The film thickness of the first interlayer 231 is favorably greater than or equal to 0.01 mm and less than or equal to 0.8 mm, more favorably greater than or equal to 0.025 mm and less than or equal to 0.4 mm, and even more favorably greater than or equal to 0.05 mm and less than or equal to 0.1 mm. If the film thickness of the first interlayer 231 is greater than a lower limit, it is excellent in treatment and handling during manufacturing. If the film thickness of the first interlayer 231 is less than an upper limit, it is excellent in heat transfer to the outside from the glass when energized.

The film thickness of the second interlayer 232 is favorably greater than or equal to 0.3 mm and less than or equal to 2.0 mm, more favorably greater than or equal to 0.4 mm and less than or equal to 1.8 mm, and even more favorably greater than or equal to 0.5 mm and less than or equal to 1.5 mm. If the thickness of the second interlayer 232 is greater than a lower limit, it is excellent in penetration tolerance. If the film thickness of the second interlayer 232 is less than an upper limit, it is excellent in weight reduction.

It is favorable that the Young's modulus of the first interlayer 231 is greater than the Young's modulus of the second interlayer 232. The Young's modulus of the first interlayer 231 being high makes it excellent in handling even if the film thickness is thin, and the conductive heating element 30, the first busbar 31, the second busbar 32, and the third busbar 33 can be precisely formed thanks to the rigidity. On the other hand, the second interlayer 232 having an adequate flexibility satisfies performance of the laminated glass related to safety such as penetration tolerance. A predetermined Young's modulus of the first interlayer 231 can be obtained by, for example, making addition of a plasticizer of a polyvinyl acetal-based resin smaller, or favorably, not adding a plasticizer.

In order to produce a laminated windshield having the cross sectional structure in FIG. 9A, first, a conductive heating element 30, a first busbar 31, and a second busbar 32 are formed on the vehicle interior side of the first interlayer 231. The conductive heating element 30, the first busbar 31, and the second busbar 32 can be integrally formed of the same material by the method described above.

Next, a first laminate is produced on the glass plate 21 by laminating the first interlayer 231 so that the surface 21b on the vehicle exterior side of the glass plate 21 contacts the vehicle interior side surfaces of the first busbar 31, the second busbar 32 formed on the first interlayer 231. Then, on the first interlayer 231 of the first laminate, a second interlayer 232 and a glass plate 22 are further laminated sequentially, to produce a second laminate. Then, by having the second laminate heated and pressurized in a vacuum as described above, a laminated glass having the cross sectional structure illustrated in FIG. 9A can be produced.

Figure 9B:
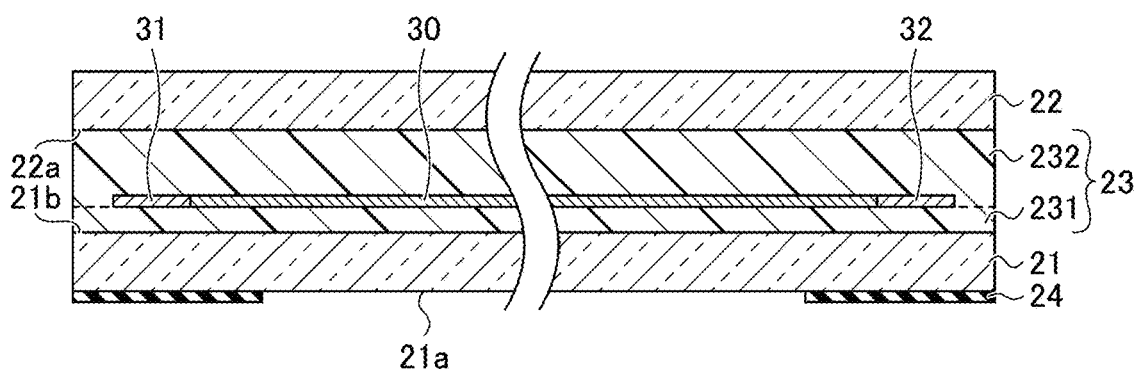

FIG. 9B illustrates another example in which the single-layer interlayer 23 in FIG. 1B is changed to a laminated structure constituted with a first interlayer 231 provided on the glass plate 21 side and a second interlayer 232 provided on the glass plate 22 side. The conductive heating element 30, the first busbar 31, and the second busbar 32 are arranged between the first interlayer 231 and the second interlayer 232.

The favorable film thicknesses and Young's modulus for the first interlayer 231 and the second interlayer 232 are substantially the same as in the case of FIG. 9A.

In order to produce a laminated glass having the cross sectional structure in FIG. 9B, first, a conductive heating element 30, a first busbar 31, and a second busbar 32 are formed on the vehicle exterior side of the first interlayer 231. The conductive heating element 30, the first busbar 31, and the second busbar 32 can be integrally formed of the same material by the method described above.

Next, a first laminate is produced on the glass plate 21 by laminating the first interlayer 231 so that the surface 21b on the vehicle exterior side of the glass plate 21 contacts the vehicle interior side surface of the first interlayer 231. Next, the second interlayer 232 is laminated so as to contact the surfaces on the vehicle exterior side of the conductive heating element 30, the first busbar 31, and the second busbar 32 formed on the first interlayer 231 of the first laminate, and the glass plate 22 is further laminated, to produce a second laminate. Then, by having the second laminate heated and pressurized in a vacuum as described above, a laminated glass having the cross sectional structure illustrated in FIG. 9B can be produced. The heating and pressurization in the vacuum deforms the second interlayer 232, and makes the second interlayer 232 come into contact with the first interlayer 231.

Figure 9C:
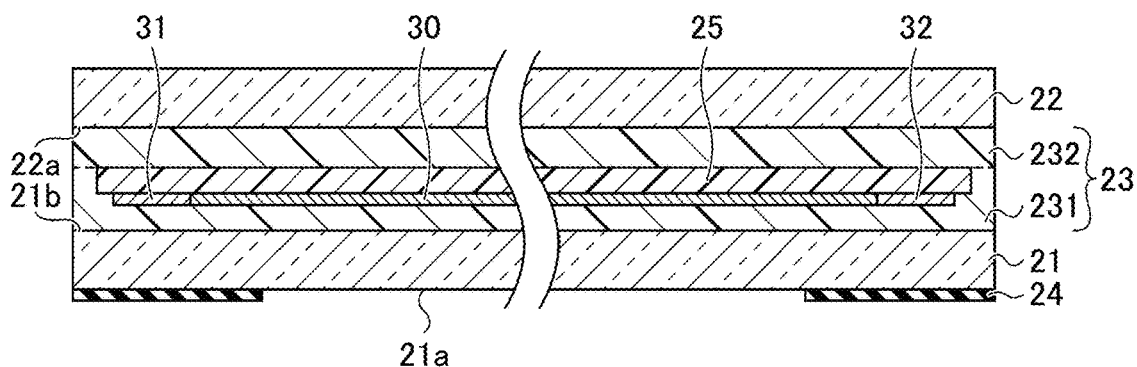

FIG. 9C illustrates yet another example in which the single-layer interlayer 23 in FIG. 1B is changed to a laminated structure constituted with a first interlayer 231 provided on the glass plate 21 side and a second interlayer 232 provided on the glass plate 22 side. The conductive heating element 30, the first busbar 31, and the second busbar 32 are formed on the surface on the vehicle interior side of a base material 25 arranged between the first interlayer 231 and the second interlayer 232.

The favorable film thicknesses and Young's modulus for the first interlayer 231 and the second interlayer 232 are substantially the same as in the case of FIG. 9A.

The base material 25 serves as a support for forming the conductive heating element 30, the first busbar 31, the second busbar 32, and the third busbar 33. As the base material 25, a film-like base material, for example, polyethylene terephthalate, polyethylene naphthalate, polycarbonate, polystyrene, cyclic polyolefin, or the like may be used. The thickness of the base material 25 is, for example, around 25 to 150 μm.

In order to produce a laminated glass having the cross sectional structure in FIG. 9C, first, a conductive heating element 30, a first busbar 31, and a second busbar 32 are formed on the vehicle interior side of the base material 25. The conductive heating element 30, the first busbar 31, and the second busbar 32 can be integrally formed of the same material by the methods described above.

Next, the first interlayer 231 is arranged on the surface 21b on the vehicle exterior side of the glass plate 21. Further, the base material 25 is arranged on the first interlayer 231 so as to make the surfaces on the vehicle interior side of the conductive heating element 30, the first busbar 31, and the second busbar 32 formed on the base material 25, contact the surface on the vehicle exterior side of the first interlayer 231, to produce the first laminate. Then, on the base material 25 of the first laminate, a second interlayer 232 and a glass plate 22 are further laminated sequentially, to produce a second laminate. Then, by having the second laminate heated and pressurized in a vacuum as described above, a laminated glass having the cross sectional structure illustrated in FIG. 9C can be produced. The heating and pressurization in the vacuum deforms the first interlayer 231, and makes the first interlayer 231 come into contact with the base material 25.

Figure 9D:
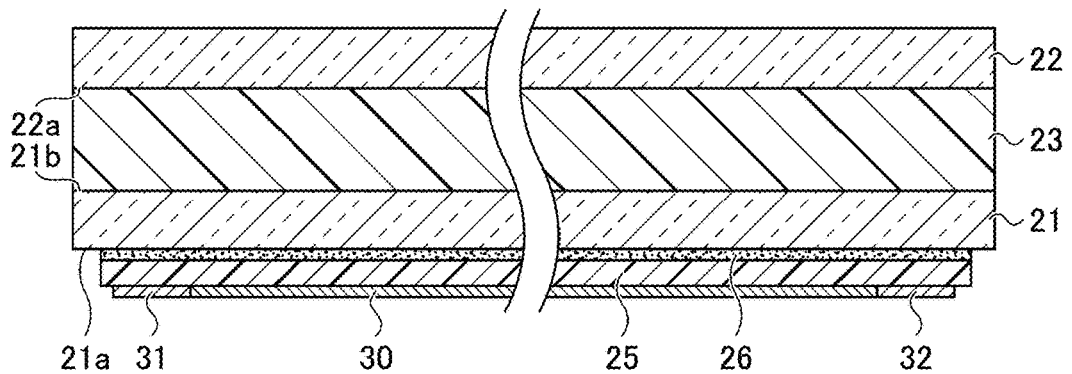

FIG. 9D illustrates an example in which a conductive heating element 30, a first busbar 31, and a second busbar 32 are provided on the surface 21a on the vehicle interior side of the glass plate 21. The conductive heating element 30, the first busbar 31, and the second busbar 32 are formed on the surface on the vehicle interior side of a base material 25. The surface on the vehicle exterior side of the base material 25 is adhered to the surface 21a on the vehicle interior side of the glass plate 21 via an adhesive 26.

The material of the adhesive 26 is not limited in particular as long as having a function of adhering the base material 25, and for example, acryl-based, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, polyvinyl butyral-based materials may be enumerated. The material of the adhesive 26 is transparent to visible light.

In order to produce a laminated glass having the cross sectional structure illustrated in FIG. 9D, the laminated glass is produced by substantially the same method as described above, in which a glass plate 21 and a glass plate 22 are laminated to have an interlayer 23 interposed in-between. Also, on one side of the base material 25, by the method described above, the first busbar 31 and the second busbar 32 are integrally formed of the same material. Then, the surface 21a on the vehicle interior side of the laminated glass plate 21 can be adhered to a surface of the base material 25 on which the conductive heating element 30 and the like are not formed, via the adhesive 26.

In this way, the cross sectional structure of the windshield can take various forms, and the interlayer 23 may be formed to have a laminated structure of multiple interlayers.

APPLICATION EXAMPLES AND COMPARATIVE EXAMPLES

In the following, although application examples and comparative examples will be described, the present inventive concept is not limited to these application examples. Note that in the following description, Examples 1, 2, 4 to 8, and 10 to 14 are application examples, and Examples 3 and 9 are comparative examples.

Example 1

First, a conductive heating element was formed on a base material. Multiple linear members of the conductive heating element were arranged at constant intervals, and the line width was changed from $W_1=10$ [μm] to $W_2=12$ [μm] at a certain linear member as the boundary.

Next, according to the method described with reference to FIG. 9C, the base material having the conductive heating element formed thereon was enclosed in the interlayer, and interposed between two glass plates, to produce a laminated glass. Green glass having a plate thickness of 2 mm was used as the two glass plates to be used for having the interlayer interposed in-between. The produced laminated glass was referred to as Sample 1.

Next, Sample 1 was placed 50 cm away from an observer to confirm the appearance of the linear members, and to evaluate whether a feeling of discomfort was caused with respect to the difference between the line widths of the linear members. In the evaluation, a case where the difference between the line widths could be recognized and a strong feeling of discomfort was caused, was classified as failing; a case where a feeling of discomfort was caused but tolerable was classified as good; and a case where no feeling of discomfort was caused was classified as excellent. The result of the appearance evaluation of Sample 1 was excellent.

Example 2

A laminated glass was produced in substantially the same way as in Example 1, except that the widths were set as $W_1=10$ [µm] and $W_2=16$ [µm]. The produced laminated glass was referred to as Sample 2. Next, the appearance was evaluated in substantially the same way as in Example 1. The result of the appearance evaluation of Sample 2 was excellent.

Example 3

A laminated glass was produced in substantially the same way as in Example 1, except that the widths were set as $W_1=10$ [µm] and $W_2=20$ [µm]. The produced laminated glass was referred to as Sample 3. Next, the appearance was evaluated in substantially the same way as in Example 1. The result of the appearance evaluation of Sample 3 was failing.

Example 4

A laminated glass was produced in substantially the same way as in Example 1, except that the widths were set as $W_i=10$ [µm] and $W_2=11$ [µm]. The produced laminated glass was referred to as Sample 4. Next, the appearance was evaluated in substantially the same way as in Example 1. The result of the appearance evaluation of Sample 4 was excellent.

Example 5

A laminated glass was produced in substantially the same way as in Example 1, except that the widths were set as $W_1=10$ [µm] and $W_2=20$ [µm]. The produced laminated glass was referred to as Sample 5. Next, the appearance was evaluated in substantially the same way as in Example 1. The result of the appearance evaluation of Sample 5 was good.

(Summary of Appearance Evaluations in Examples 1 to 5)

FIG. 10 shows, for Examples 1 to 5 (Samples 1 to 5), the values of $W_1$, $W_2$, and $|W_1-W_2|$, together with the results of the appearance evaluations with respect to the difference between the line widths.

As tabulated in FIG. 10, in the cases where the difference $|W_1-W_2|$ between the line widths of adjacent linear members is 1, 2, and 6 [µm], no feeling of discomfort was caused in the difference between the line widths; when $|W_1-W_2|$ became 8 [µm], a feeling of discomfort was caused in the difference between the line widths, but within a tolerable degree. In contrast, in the case where the difference $|W_1-W_2|$ between the line widths of adjacent linear members was 10 [µm], a strong feeling of discomfort was caused. In other words, if the difference $|W_1-W_2|$ between the line widths of adjacent linear members is less than 10 [µm], the driver is not likely to have a feeling of discomfort in the change in the line widths, and can safely drive the vehicle.

Example 6

First, a conductive heating element was formed on a base material. In Example 6, among linear members in a 50-mm square range, the maximum value $|W_i-W_{i+1}|$max among absolute values of differences between the line width $W_i$[µm] of any linear member and the line width $W_{i+1}$ [µm] of its adjacent linear member is set to 2 [µm] to be the same as $|W_1-W_2|$ in Example 1. Also, the line width of each of the linear members was changed so that the standard deviation of the line width of the linear members became 1 [µm].

Next, according to the method described with reference to FIG. 9C, the base material having the conductive heating element formed thereon was enclosed in the interlayer, and interposed between two glass plates, to produce a laminated glass. Green glass having a plate thickness of 2 mm was used as the two glass plates to be used for having the interlayer interposed in-between. The produced laminated glass was referred to as Sample 6.

Note that apart from Sample 6, a comparative sample was produced in which each of the linear members has a constant line width.

Next, Sample 6 and the comparative sample were placed 50 cm away from the observer who observed the head lamps of an automobile located 5 m ahead, to evaluate the degree of improvement brought by Sample 6 over the comparative sample with respect to rainbow patterns and shafts of light. In the evaluation, a case where the rainbow patterns and the shafts of light were confirmed to weaken compared to those of the comparative sample was classified as good; or if not confirmed, the case was classified as failing. The result of the evaluation of the rainbow patterns and the shafts of light of Sample 6 was good.

Example 7

A laminated glass was produced in substantially the same way as in Example 6, except that $|W_i-W_{i+1}|$max was set to 6 [µm] to be the same as $|W_1-W_2|$ in Example 2, and the line width of each linear member was changed to make the standard deviation of the line width of the linear members become 3.2 [µm]. The produced laminated glass was referred to as Sample 7. Next, rainbow patterns and shafts of light were evaluated in substantially the same way as in Example 6. The result of the evaluation of the rainbow patterns and the shafts of light of Sample 7 was good.

Example 8

A laminated glass was produced in substantially the same way as in Example 6, except that $|W_i-W_{i+1}|$max was set to 10 [µm] to be the same as $|W_1-W_2|$ in Example 3, and the line width of each linear member was changed to make the standard deviation of the line width of the linear members become 4.6 [µm]. The produced laminated glass was referred to as Sample 8. Next, rainbow patterns and shafts of light were evaluated in substantially the same way as in Example 6. The result of the evaluation of the rainbow patterns and the shafts of light of Sample 8 was good.

Example 9

A laminated glass was produced in substantially the same way as in Example 6, except that $|W_i-W_{i+1}|$max was set to 1 [μm] to be the same as |W₁−W₂| in Example 4, and the line width of each linear member was changed to make the standard deviation of the line width of the linear members become 0.5 [μm]. The produced laminated glass was referred to as Sample 9. Next, rainbow patterns and shafts of light were evaluated in substantially the same way as in Example 6. The result of the evaluation of the rainbow patterns and the shafts of light of Sample 9 was failing.

Example 10

A laminated glass was produced in substantially the same way as in Example 6, except that $|W_i-W_{i+1}|$max was set to 8 [μm] to be the same as |W₁−W₂| in Example 5, and the line width of each linear member was changed to make the standard deviation of the line width of the linear members become 2.8 [μm]. The produced laminated glass was referred to as Sample 10. Next, rainbow patterns and shafts of light were evaluated in substantially the same way as in Example 6. The result of the evaluation of the rainbow patterns and the shafts of light of Sample 10 was good.
(Summary of Evaluations of Rainbow Patterns and Shafts of Light in Examples 6 to 10)

FIG. 11 shows, for Examples 6 to 10 (Samples 6 to 10), the values of $|W_i-W_{i+1}|$max and the standard deviation, together with the results of the evaluations of the rainbow patterns and the shafts of light.

As tabulated in FIG. 11, in the cases of $|W_i-W_{i+1}|$max being 2 [μm] and the standard deviation being 1 [μm], $|W_i-W_{i+1}|$max being 6 [μm] and the standard deviation being 3.2 [μm], $|W_i-W_{i+1}|$max being [μm] and the standard deviation being 4.6 [μm], and $|W_i-W_{i+1}|$max being 8 [μm] and the standard deviation being 2.8 [μm], the rainbow patterns and the shafts of light could be confirmed to weaken compared to those of the comparative sample. In contrast, in the case of $|W_i-W_{i+1}|$max being 1 [μm] and the standard deviation being 0.5 [μm], the rainbow patterns and the shafts of light could not be confirmed to weaken compared to those of the comparative sample. In other words, if $|W_i-W_{i+1}|$max is greater than 1 [μm] and the standard deviation is greater than 0.5 [μm], an effect of rectifying rainbow patterns due to diffraction of light and shafts of light due to regular scattering of light, is obtained.

Also, considering the results in FIGS. 10 and 11 together, it is favorable to satisfy the requirements of 1 [μm]<$|W_i-W_{i+1}|$max<10 [μm], and of the standard deviation of the line width of the linear members being greater than 0.5 [μm]. By satisfying these requirements, the driver is not likely to have a feeling of discomfort in change in the line widths, and can drive the vehicle safely, and as well, an effect of rectifying rainbow patterns due to diffraction of light and shafts of light due to regular scattering of light, is obtained. In other words, safe driving can be realized simultaneously with improvement of rainbow patterns and shafts of light.

Example 11

First, a conductive heating element was formed on a base material. Multiple linear members of the conductive heating elements were arranged at constant intervals, and the line width was set to 16 μm. In Example 11, among the linear members in a 50-mm square range, the maximum value $|WF_i-WF_{i+1}|$max among absolute values of differences between the wave factor $WF_i$ of any linear member and the wave factor $WF_{i+1}$ of its adjacent linear member, was set to 0.25.

Next, according to the method described with reference to FIG. 9C, the base material having the conductive heating element formed thereon was enclosed in the interlayer, and interposed between two glass plates, to produce a laminated glass. Green glass having a plate thickness of 2 mm was used as the two glass plates to be used for having the interlayer interposed in-between. The produced laminated glass was referred to as Sample 11.

Note that apart from Sample 11, a comparative sample was produced in which each of the linear members has a constant wave factor.

Next, Sample 11 and the comparative sample were placed 50 cm away from the observer who observed the head lamps of an automobile located 5 m ahead, to evaluate the degree of improvement brought by Sample 11 over the comparative sample with respect to rainbow patterns and shafts of light. In the evaluation, compared to the comparative sample, a case where the rainbow patterns and the shafts of light were confirmed to noticeably weaken, was classified as excellent; a case where those were confirmed to slightly weaken was classified as good; and a case where no weakening was confirmed was classified as failing. The result of the evaluation of the rainbow patterns and the shafts of light of Sample 11 was excellent. Also, under the same observation conditions, the appearance of the linear members was confirmed to evaluate whether a feeling of discomfort was caused due to the difference between the wave factors of the linear members. A case where the difference between the wave factors could be recognized, and a strong feeling of discomfort was caused was classified as failing; a case where a feeling of discomfort was caused but tolerable was classified as good; and a case where no feeling of discomfort was caused was classified as excellent. The result of the appearance evaluation of Sample 11 was good.

Example 12

A laminated glass was produced in substantially the same way as in Example 11, except that the wave factor of each of the linear members was changed to make $|WF_i-WF_{i+1}|$max become 0.1. The produced laminated glass was referred to as Sample 12. Next, rainbow patterns and shafts of light were evaluated in substantially the same way as in Example 11. The result of the evaluation of the rainbow patterns and the shafts of light of Sample 12 was excellent. Further, the appearance was evaluated in substantially the same way as in Example 11. The result of the appearance evaluation of Sample 12 was excellent.

Example 13

A laminated glass was produced in substantially the same way as in Example 11, except that the wave factor of each of the linear members was changed to make $|WF_i-WF_{i+1}|$max become 0.3. The produced laminated glass was referred to as Sample 13. Next, rainbow patterns and shafts of light were evaluated in substantially the same way as in Example 11. The result of the evaluation of the rainbow patterns and the shafts of light of Sample 13 was excellent. Further, the appearance was evaluated in substantially the same way as in Example 11. The result of the appearance evaluation of Sample 13 was failing.

Example 14

A laminated glass was produced in substantially the same way as in Example 11, except that the wave factor of each of the linear members was changed to make $|WF_i-WF_{i+1}|$max become 0.03. The produced laminated glass was referred to as Sample 14. Next, rainbow patterns and shafts of light were evaluated in substantially the same way as in Example 11. The result of the evaluation of the rainbow patterns and the shafts of light of Sample 14 was good. Further, the appearance was evaluated in substantially the same way as in Example 11. The result of the appearance evaluation of Sample 14 was excellent.

(Summary of Evaluations of Rainbow Patterns, Shafts of Light, and Appearance in Examples 11 to 14)

FIG. 12 shows, for Examples 11 to 14 (Samples 11 to 14), the values of $|WF_i-WF_{i+1}|$, the results evaluations of rainbow patterns and shafts of light, and the results of the appearance evaluations with respect to the difference between the wave factors.

As tabulated in FIG. 12, in the cases of $|WF_i-WF_{i+1}|$max being 0.25, 0.1, and 0.3, the rainbow patterns and the shafts of light were confirmed to weaken noticeably compared to those of the comparative sample. In contrast, in the case of $|WF_i-WF_{i+1}|$max being 0.03, the rainbow patterns and the shafts of light were confirmed to weaken slightly compared to those of the comparative sample.

Further, in the case of $|WF_i-WF_{i+1}|$max being 0.1 or 0.03, no feeling of discomfort was caused in the difference between the wave factors, and in the case of $|WF_i-WF_{i+1}|$max becoming 0.25, although a feeling of discomfort was caused in the difference between the wave factors, it is tolerable. In contrast, in the case of $|WF_i-WF_{i+1}|$max as the difference of the wave factors between adjacent linear members becoming 0.3, a strong feeling of discomfort was caused.

In other words, if $|WF_i-WF_{i+1}|$max is greater than 0.03, an effect of significantly rectifying rainbow patterns due to diffraction of light and shafts of light due to regular scattering of light is obtained, and if less than 0.3, the driver is hardly likely to have a feeling of discomfort in change in the line widths, and can drive the vehicle safely.

As described above, the favorable embodiments and the like have been described in detail; note that the present inventive concept is not limited to the embodiments and the like described above, and can be changed and replaced in various ways without deviating from the scope described in the claims.

For example, the conductive heating element 30, the first busbar 31, the second busbar 32, and the third busbar 33 may be arranged on the glass plate 22 side on the vehicle exterior side.

The invention claimed is:

1. A laminated glass comprising:
a pair of glass plates facing each other;
an interlayer positioned between the pair of glass plates; and
a plurality of linear members arranged in parallel to heat a transparent region of the pair of glass plates,
wherein each of the plurality of linear members has a line width of greater than or equal to 2 μm and less than or equal to 30 μm,
wherein at least part of the plurality of linear members has the line width that is not constant, and
wherein the plurality of linear members include linear members having line widths different from one another, and
wherein among linear members within a 50-mm square at any location in a region where the linear members are arranged, when denoting a line width of any one of the linear members as $W_i$ [μm] and a line width of its adjacent linear member as $W_{i+1}$ [μm], a maximum value $|W_i-W_{i+1}|$max among absolute values of differences between $W_i$ and $W_{i+1}$ falls within a range of 1 [μm]<$|W_i-W_{i+1}|$max<10 [μm], and a standard deviation of the line width of the plurality of linear members is greater than 0.5 [μm].

2. The laminated glass as claimed in claim 1, further comprising:
a first busbar and a second busbar configured to feed power to the plurality of linear members,
wherein the first busbar is arranged along a left edge of the pair of glass plates, and the second busbar is arranged along a right edge of the pair of glass plates.

3. The laminated glass as claimed in claim 2, wherein the plurality of linear members, the first busbar, and the second busbar are integrally formed.

4. The laminated glass as claimed in claim 1, wherein the transparent region includes a test region A as defined in UN Regulation No. 43, and
wherein the plurality of linear members are arranged in the test region A.

5. The laminated glass as claimed in claim 1, wherein at least surfaces on a vehicle exterior side of the plurality of linear members are colored.

6. The laminated glass as claimed in claim 1, wherein surfaces on a vehicle exterior side, surfaces on a vehicle interior side, and side surfaces of the plurality of linear members are colored.

7. The laminated glass as claimed in claim 1, wherein the transparent region includes an information transmission/reception region through which a device installed in a vehicle transmits and/or receives information, and
wherein the linear members are arranged in the information transmission/reception region.

8. The laminated glass as claimed in claim 1,
wherein among linear members within a 50-mm square at any location in a region where the plurality of linear members are arranged, when denoting a wave factor of any one of the linear members as $WF_i$, and a wave factor of its adjacent linear member as $WF_{i+1}$, a maximum value $|WF_i-WF_{i+1}|$max among absolute values of differences between $WF_i$ and $WF_{i+1}$ falls within a range of 0.03<$|WF_i-WF_{i+1}|$max<0.3, where the wave factor is a value obtained by dividing a line length of a wavy line having a point A as a start point and a point B as an end point, by a straight-line distance between the point A and the point B.

9. A laminated glass comprising:
a pair of glass plates facing each other;
an interlayer positioned between the pair of glass plates; and
a plurality of linear members arranged in parallel to heat a transparent region of the pair of glass plates,
wherein each of the plurality of linear members has a line width of greater than or equal to 2 μm and less than or equal to 30 μm,
wherein at least part of the plurality of linear members has the line width that is not constant,
wherein the plurality of linear members include linear members having line widths different from one another, and
wherein among linear members within a 50-mm square at any location in a region where the plurality of linear members are arranged, when denoting a wave factor of any one of the linear members as $WF_i$, and a wave factor of its adjacent linear member as $WF_{i+1}$, a maximum value $|WF_i-WF_{i+1}|$max among absolute values of differences between $WF_i$ and $WF_{i+1}$ falls within a range of $0.03<|WF_i-WF_{i+1}|max<0.3$, where the wave factor is a value obtained by dividing a line length of a wavy line having a point A as a start point and a point B as an end point, by a straight-line distance between the point A and the point B.

10. The laminated glass as claimed in claim 9, further comprising:
a first busbar and a second busbar configured to feed power to the plurality of linear members,
wherein the first busbar is arranged along a left edge of the pair of glass plates, and the second busbar is arranged along a right edge of the pair of glass plates.

11. The laminated glass as claimed in claim 10, wherein the plurality of linear members, the first busbar, and the second busbar are integrally formed.

12. The laminated glass as claimed in claim 9, wherein the transparent region includes a test region A as defined in UN Regulation No. 43, and
wherein the plurality of linear members are arranged in the test region A.

13. The laminated glass as claimed in claim 9, wherein at least surfaces on a vehicle exterior side of the plurality of linear members are colored.

14. The laminated glass as claimed in claim 9, wherein surfaces on a vehicle exterior side, surfaces on a vehicle interior side, and side surfaces of the plurality of linear members are colored.

15. The laminated glass as claimed in claim 9, wherein the transparent region includes an information transmission/reception region through which a device installed in a vehicle transmits and/or receives information, and
wherein the linear members are arranged in the information transmission/reception region.

* * * * *